United States Patent
Lee et al.

(10) Patent No.: US 9,434,336 B2
(45) Date of Patent: Sep. 6, 2016

(54) METHOD FOR UNFOLDING EXTERNAL AIR BAG

(71) Applicant: Hyundai Motor Company, Seoul (KR)

(72) Inventors: Han Sung Lee, Seoul (KR); Jin Ho Bae, Suwon-si (KR); Yong Sun Kim, Namyangju-si (KR); Ki Jin Kwon, Gwangmyeong-si (KR); Joon Mo Park, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/498,639

(22) Filed: Sep. 26, 2014

(65) Prior Publication Data
US 2015/0321633 A1 Nov. 12, 2015

(30) Foreign Application Priority Data

May 12, 2014 (KR) ........................ 10-2014-0056677

(51) Int. Cl.
| | |
|---|---|
| *B60R 22/00* | (2006.01) |
| *E05F 15/00* | (2015.01) |
| *G05D 1/00* | (2006.01) |
| *G05D 3/00* | (2006.01) |
| *G06F 7/00* | (2006.01) |
| *G06F 17/00* | (2006.01) |

(Continued)

(52) U.S. Cl.
CPC ......... *B60R 21/0134* (2013.01); *B60R 21/013* (2013.01); *B60R 21/0132* (2013.01); *B60R 21/36* (2013.01); *B60R 2021/0004* (2013.01); *B60R 2021/01013* (2013.01); *B60R 2021/01231* (2013.01)

(58) Field of Classification Search
CPC .......... B60R 21/0132; B60R 21/0134; B60R 21/013; B60R 21/36; B60R 2021/0004; B60R 2021/01231; B60R 2021/01013
USPC ...................................... 701/45, 301; 342/70
See application file for complete search history.

(56) References Cited

U.S. PATENT DOCUMENTS

2004/0107033 A1* 6/2004 Rao ........................ B60R 21/36
                                                                  701/45
2007/0228704 A1* 10/2007 Cuddihy ............. B60R 21/0132
                                                                  280/735

(Continued)

FOREIGN PATENT DOCUMENTS

| JP | 2006-48435 A | 2/2006 |
|---|---|---|
| JP | 2013-214263 A | 10/2013 |

(Continued)

*Primary Examiner* — Jaime Figueroa
(74) *Attorney, Agent, or Firm* — Morgan, Lewis & Bockius LLP

(57) ABSTRACT

A method for deploying an external air bag, including searching region of a front of vehicle, updating a physical amount of a searched object within the searching region each measurement period of a front sensor, determining a predicted physical amount each unit time during each measurement period, and predicting the physical amount by assuming that a specific searched object is moved at a constant speed when a capture of the specific searched object which was searched by the front sensor is stopped, selecting a target object among searched objects based on a relative speed or an overlap of the searched object obtained by the updating step or (Time To External Airbag) TTE and deploying the external air bag in a case in which each of a relative speed and an overlap predicted when the target object collides are a predetermined level or more.

11 Claims, 15 Drawing Sheets

(51) Int. Cl.
*B60R 21/0134* (2006.01)
*B60R 21/0132* (2006.01)
*B60R 21/013* (2006.01)
*B60R 21/36* (2011.01)
B60R 21/01 (2006.01)
B60R 21/00 (2006.01)

(56) References Cited

U.S. PATENT DOCUMENTS

2013/0242284 A1* 9/2013 Zeng ................ G01S 17/66
356/4.01
2014/0163824 A1* 6/2014 Kim .................. B60R 21/0136
701/45
2014/0163825 A1* 6/2014 Kim .................. B60R 21/36
701/45

FOREIGN PATENT DOCUMENTS

| KR | 10-2010-0056883 A | 5/2010 |
| KR | 10-2011-0037441 A | 4/2011 |
| KR | 10-2012-0013799 A | 2/2012 |
| KR | 10-2012-0063626 A | 6/2012 |
| KR | 10-2013-0138392 A | 12/2013 |

* cited by examiner

METHOD FOR UNFOLDING EXTERNAL AIR BAG

CROSS REFERENCE TO RELATED APPLICATION

The present application claims priority to Korean Patent Application Number 10-2014-0056677 filed May 12, 2014, the entire contents of which is incorporated herein for all purposes by this reference.

BACKGROUND OF THE INVENTION

1. Field of the Invention

The present invention relates to a method for deploying an external air bag mounted in a vehicle to predict effective collision and unfold the external air bag at an accurate timing without error based on the prediction.

Particularly, the present invention relates to a method for deploying an external air bag capable of substantially and effectively performing an deploying determination even at the time of high speed collision or unexpected collision by predicting a physical amount every unit time to obtain the physical amount because it is lacking to detect the physical amount measured by a front sensor using only a period of the sensor and performing the deploying determination based on the obtained physical amount.

2. Description of Related Art

As a technology for increasing stability of a vehicle, an external air bag unfolded from a front or a rear of the vehicle to the outside has been recently developed and suggested.

The above-mentioned technology has problems that it has to sense and predict a collision situation of the vehicle and unfold an air bag to maximally obtain collision absorption effect by deploying the air bag at an accurate timing, it has to increase stability of a system by accurately deploying the air bag when the air bag needs to be unfolded, and it has to increase reliability of the system by preventing an erroneous deploying in which the air bag is erroneously unfolded when the air bag needs not to be unfolded.

A method of controlling an airbag module using information before collision was disclosed as a related art. However, in the related art, a precise controlling method capable of preventing an erroneous deploying and obtaining an effective deploying by accurately determining the collision has not been suggested. Moreover, even though measurement performance of the sensor is lack, a data managing method capable of supporting the lack to maximally perform an effective determination has not been suggested.

In addition, a logic capable of surely preventing the erroneous deploying by finally checking validity of the deploying once more has not been suggested.

The information disclosed in this Background of the Invention section is only for enhancement of understanding of the general background of the present invention and should not be taken as an acknowledgement or any form of suggestion that this information forms the prior art already known to a person skilled in the art.

BRIEF SUMMARY

Various aspects of the present invention are directed to providing a method for deploying an external air bag mounted in a vehicle to predict effective collision and unfold the external air bag at an accurate timing without error based on the prediction.

In an aspect of the present invention, a method for deploying an external air bag, the method may include a setting step of setting a searching region of a front of a vehicle, an updating step of updating a physical amount of a searched object within the searching region each measurement period of a front sensor, determining a predicted physical amount each unit time during the each measurement period, and predicting the physical amount by assuming that a specific searched object is moved at a constant speed when a capture of the specific searched object which was searched by the front sensor is stopped, a target selecting step of selecting a target object among searched objects based on a relative speed or an overlap of the searched object obtained by the updating step or TTE which is a remaining time until the target object collides with an air bag cushion upon assuming that the external air bag is deployed, and a deploying step of deploying the external air bag in a case in which each of a relative speed and an overlap predicted when the target object collides are a predetermined level or more.

In the updating step, when the capture of the specific searched object which was searched by the front sensor is stopped, the physical amount is predicted by assuming that the corresponding searched object is moved at the constant speed for a predetermined time, and a tracking of the corresponding searched object is stopped after the predetermined time is elapsed.

The front sensor is a camera sensor, and in the updating step, the capture of the specific searched object which was searched by the camera sensor is stopped, and the physical amount is predicted by assuming that the searched object is moved at the constant speed for the predetermined time upon occurrence of black-out or white-out of the camera sensor.

The front sensor is a radar sensor, and in the updating step, the capture of the specific searched object which was searched by the radar sensor is stopped, and the physical amount is predicted by assuming that the searched object is moved at the constant speed for a predetermined time in a case in which a vertical direction displacement of the vehicle is changed by a predetermined size or more.

The front sensor is a camera sensor and a radar sensor, and in the updating step, in a case in which the capture of the specific searched object which was searched by the front sensor is normally maintained in the radar sensor, but is stopped in the camera sensor, when a black-out or a white-out of the camera sensor is simultaneously generated, the physical amount is predicted by the camera sensor by assuming that the searched object is moved at the constant speed for a predetermined time.

In the updating step, in a case in which the capture of the specific searched object which was searched by the front sensor is stopped in the radar sensor, when the vertical direction displacement of the vehicle is simultaneously changed by a predetermined size or more, the physical amount is predicted by the radar sensor by assuming that the searched object is moved at the constant speed for the predetermined time.

The setting step may include a managing step of assigning to and managing identification of each searched object.

The each unit time in the updating step is 1 ms.

In the updating step, in the case in which a measurement of the front sensor is performed at a time i, a physical amount of i+1 is determined using any one tracking filter of an alpha-beta filter or a kalman filter and is determined using a previous physical amount from i+1 to a next measurement period.

In the updating step, in determining the physical amount from i+1 to the next measurement period, a displacement is determined by adding a value obtained by multiplying a unit time to a speed of the previous step to a displacement of the previous step.

In the updating step, in determining the physical amount from i+1 to a next measurement period, a speed is determined from the speed of the previous step by using an acceleration value at a time i.

In the updating step, in determining the physical amount from i+1 to a next measurement period, TTE is determined by dividing a value obtained by subtracting a thickness of the air bag cushion from a relative distance of a corresponding timing by a relative speed of the corresponding timing, wherein the TTE is a remaining time until being collided with the air bag cushion upon assuming that the external air bag is unfolded.

In another aspect of the present invention, a method for deploying an external air bag for determining a deploying of the external air bag, may include setting a searching region having a predetermined range, tracking a physical amount of a searched object entering the searching region and updating the physical amount each measurement period of a front sensor, determining a predicted physical amount each unit time during the measurement period, determining whether or not the deploying is performed each unit time based on the determined physical amount, and predicting the physical amount by assuming that the corresponding searched object is moved at a constant speed when a capture of a specific searched object which was searched by the front sensor is stopped.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
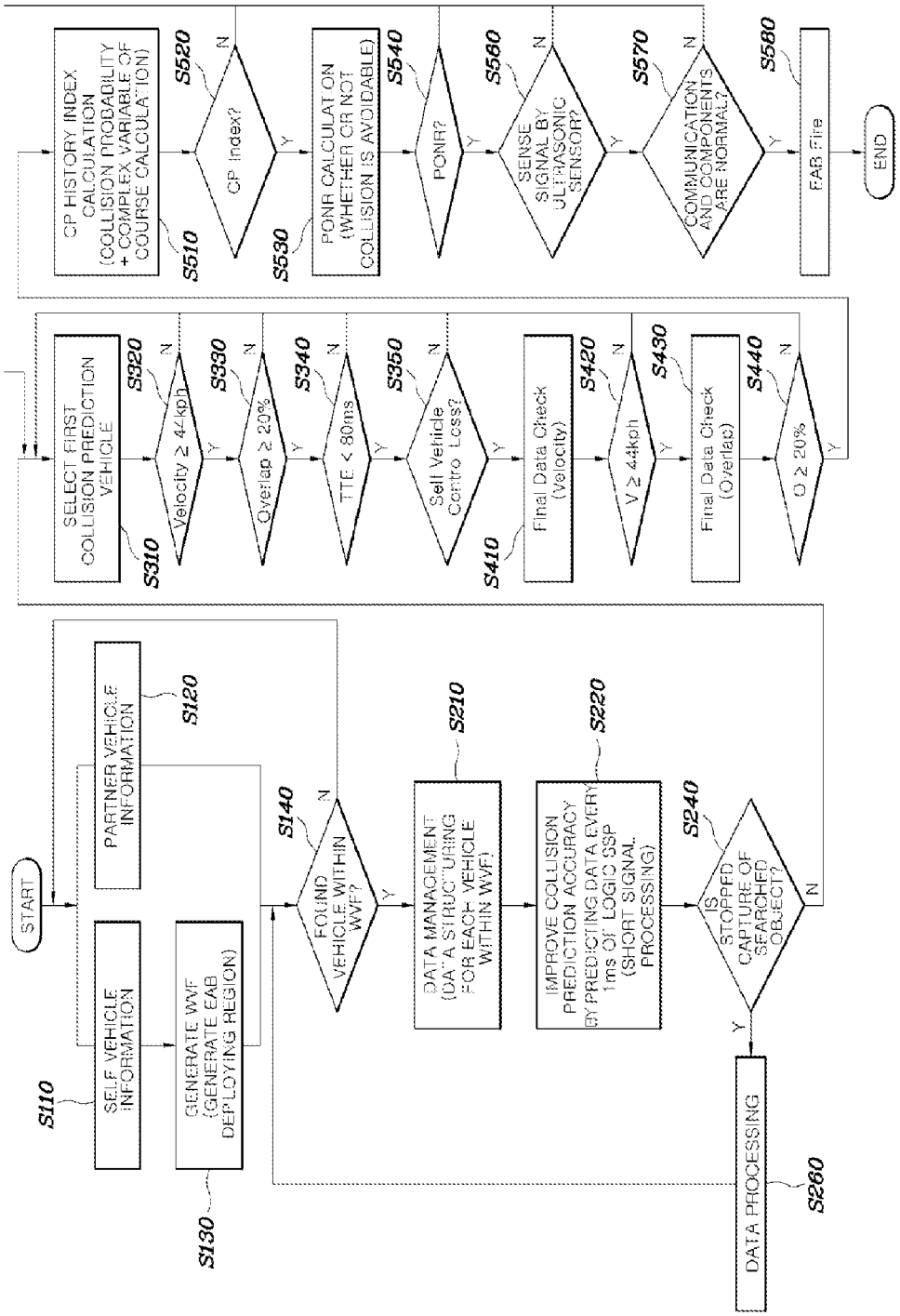
FIG. 1 is a flow chart of an exemplary method for deploying an external air bag according to the present invention.

FIG. 1 is a flow chart of a method for deploying an external air bag according to various exemplary embodiments of the present invention.

A method for deploying an external air bag according to various embodiments of the present invention includes a setting step of setting a searching region of a front of vehicle, an updating step of updating a physical amount of a searched object within the searching region every measurement period of a front sensor, calculating a predicted physical amount every unit time during the measurement period, and predicting the physical amount by assuming that a specific searched object is moved at a constant speed when a capture of the specific searched object which was searched by the front sensor is stopped, a target selecting step of selecting a target object among the searched objects based on a relative speed or an overlap of the searched object obtained by the updating step or Time To External Airbag (TTE) which is a remaining time until being collided with an air bag cushion upon assuming that the external air bag is unfolded, and an deploying step of deploying the external air bag in the case in which a relative speed and an overlap predicted when the target object collides are a predetermined level or more.

In various aspects of the present invention, since an effective deploying determination may be performed by updating the physical amount of the object and tracking the object searched by using the front sensor, the present invention may be characterized by a method of updating the physical amount.

First, various embodiments of the method for deploying the external air bag according to the present invention will be described. First, information on a self vehicle is obtained and information of a partner object is obtained (S110 and S120). The above information is measured by using a sensor measuring a physical amount of the self vehicle in a case of the self vehicle and using sensors such as a laser sensor, radar sensor, and a camera sensor provided in the self vehicle in a case of the partner object. According to various embodiments of the present invention, the physical amount is based on a measurement corresponding to relative motion between the vehicle and the object including, as displayed in Tables 1-3 below, velocity of the vehicle, acceleration of the vehicle, Time To External Airbag (TTE), Time To Collision (TTC), yaw rate, and velocity of the object, velocity of the object relative to the vehicle, distance between the vehicle and the object, and overlap amount between the vehicle and the object.

Specifically, the information on the self vehicle obtained by the above-mentioned sensors is as follows.

TABLE 1

| Sensor | No | Information Transmitted to ACU |
|---|---|---|
| Vehicle Speed Sensor | 1 | FL(Front Left) Wheel Speed |
|  | 2 | FR(Front Right) Wheel Speed |
|  | 3 | RL(Rear Left) Wheel Speed |
|  | 4 | RR(Rear Right) Wheel Speed |
| Brake Sensor | 5 | M/Cylinder Pressure(MPa) |
|  | 6 | Wheel Slip Ratio |
|  | 7 |  |
|  | 8 |  |
| Acceleration Sensor | 9 | Longitudinal Acceleration |
|  | 10 | Lateral Acceleration |
| YawRate Sensor | 11 | Yaw Rate(rad/sec) |
|  | 12 |  |
| Wheel Angle Sensor | 13 | Str'g Wheel Angle |
|  | 14 |  |

Meanwhile, the information on the partner object obtained by the sensor is as follows.

TABLE 2

| Sensor | No | Information Transmitted to ACU |
|---|---|---|
| Radar (40 ms) | 1 | Relative Speed |
|  | 2 | Relative Distance |
|  | 3 | Longi. Position |
|  | 4 | Lat. Position |
|  | 5 | Tracking ID |
|  | 6 | TTC—Time To Collision |
| Camera (80 ms) | 7 | Classification Information |
|  | 8 | Obj. Width |
|  | 9 | Longi. Position |
|  | 10 | Lat. Position |
|  | 12 |  |
|  | 13 |  |
|  | 14 |  |
| Ultrasonic (10 ms) | 15 | Relative Distance |
|  | 16 |  |

TABLE 3

| No | Information Transmitted to ACU |
|---|---|
| 1 | Object ID |
| 2 | Position X |

TABLE 3-continued

| No | Information Transmitted to ACU |
|---|---|
| 3 | Position Y |
| 4 | Velocity X |
| 5 | Velocity Y |
| 6 | Object Age |
| 7 | Object Prediction Age |
| 8 | Object Time Offset |
| 9 | Object Classification |

The self vehicle may obtain relative information and absolute information between the partner object and the self vehicle from the information of the sensors as described above. The above-mentioned information is all used in the following processes.

Figure 2:
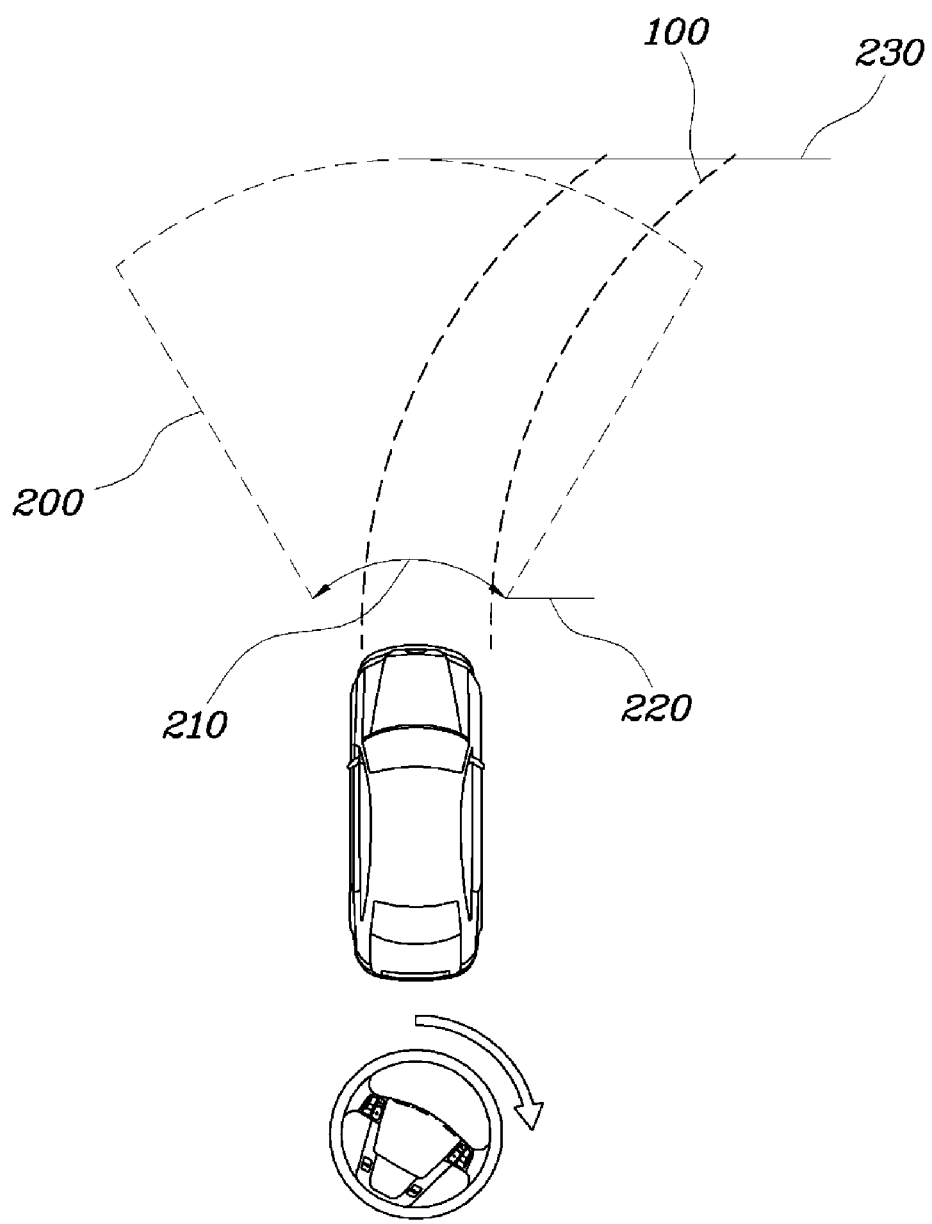
FIG. 2 and FIG. 3 are views for describing a searching region of the method for deploying an external air bag according to the present invention.
Figure 3:
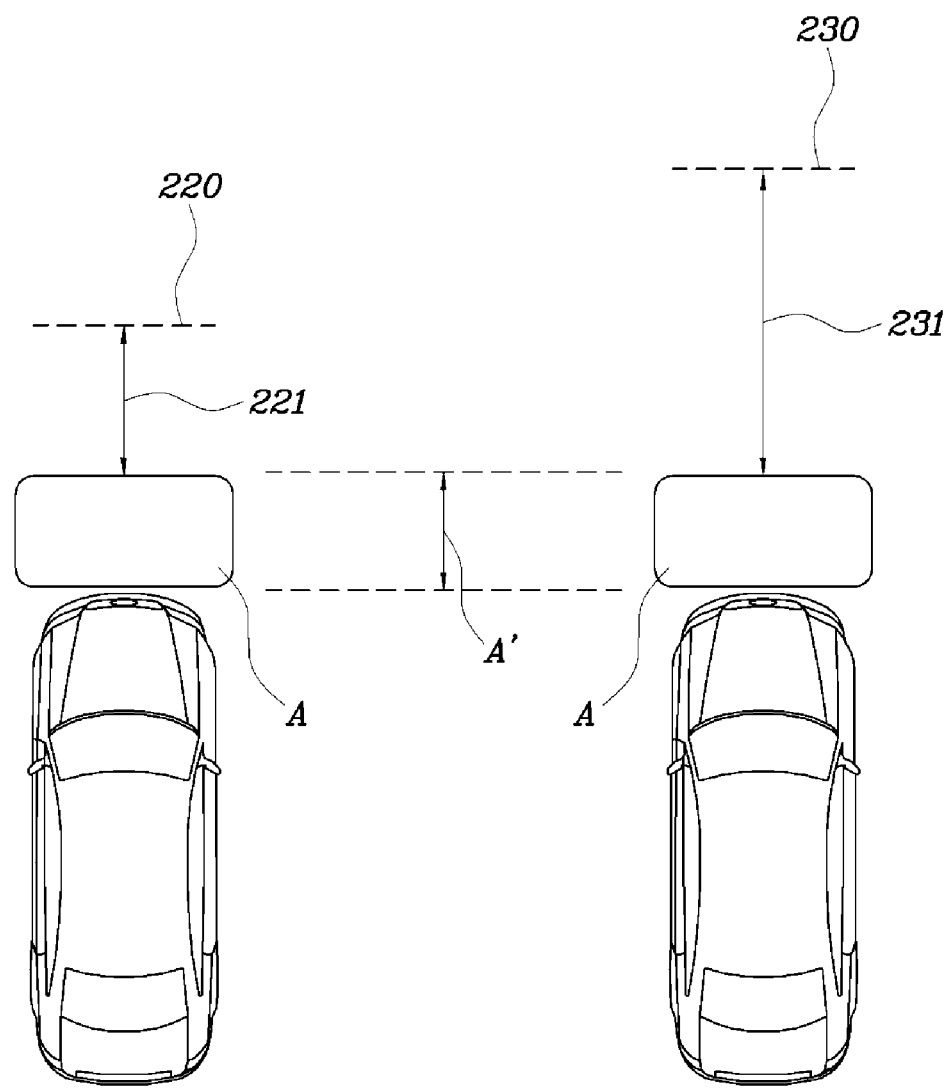

A setting step (S130) of setting a searching region (Generate WVF (Generate EAB deploying region)) of a front of vehicle is performed. In the setting step, as shown in FIG. 2, a basic region which is horizontally bent and moved along a steering of the vehicle and a reality region considering a time of the external air bag of the vehicle and a vehicle speed are set.

Here, in a case of the basic region, a rotation radius of the vehicle is calculated by a vehicle width and a steering angle, wherein the basic region is calculated by offsetting the rotation radius to both width sides of the vehicle. The above-mentioned rotation radius of the vehicle may be derived from the following Equation.

$$\rho = \frac{W}{2} \cdot \frac{W_{RL} - W_{RR}}{W_{RL} + W_{RR}} \text{ (Calculate Rotation Radius)} \qquad \text{[Equation 1]}$$

$*W$: Vehicle Wheel Base $W_{RX}$: Wheel Speed

In addition, the reality region having a fan shape may be set by considering the relative speed of the vehicle and a deploying time of the external air bag.

That is, if a timing in which the external air bag is fully unfolded is 65 ms, a minimal limitation of the reality region is calculated by considering a timing in which the air bag cushion is fully unfolded from a minimal relative speed. That is, in the case in which a protection is intended by deploying the external air bag from a time of collision of the relative speed of at least 44 km/h by using the external air bag according to the present invention, a separated distance is calculated by the relative speed for as much as 65 ms which is at least a time point required to unfold the external air bag and a thickness of the air bag is added to the separated distance, such that a limitation value of the reality region which needs to be considered as the minimum may be obtained.

That is, as a minimum value of the reality region of this case, the minimum value of the reality region may be calculated as 1.5 m obtained by adding 0.7 m which is the thickness of the air bag to 0.8 m which is a distance at 44 km/h for as much as 65 ms.

In addition, in a case of a maximum value, when the external air bag is intended to be unfolded only up to a collision at a relative speed of maximally 160 km/h, the minimum value of the reality region may be calculated as a value obtained by adding 0.7 m which is the thickness of the air bag to 2.9 m which is a distance at 160 km/h for as much as 65 ms.

However, since the above case is a case in which the vehicle speed is very fast, a minimal recognition time required to perform recognition by the sensor such as a camera, a time of sampling a measurement value by the sensor, and a time as much as sampling times need to be further secured. Therefore, in the case of the maximal value, 8.9 m which is a distance at 160 km/h for as much as 200 ms which is a camera determination time and 8.9 m which is a distance at 160 km/h for as much as 200 ms which is a time of sampling 40 ms which is sampling time 5 times are additionally required, thereby requiring the maximal value of 21.4 m.

Therefore, in the case of various embodiments of the present invention, the air bag may be unfolded by searching the partner object from a region of minimally 1.5 m and may be unfolded by searching the partner object up to maximally 21.4 m.

Meanwhile, the partner object is searched by overlapping the basic region and the reality region together with each other, wherein in the case in which the partner object is present in both the basic region and the reality region, the partner object is set as an object having a higher dangerous level, or when the reality region may cover and track only ten objects, if twelve objects are searched, the ten objects may be utilized as a reference capable of erasing the partner object in a direction removing the partner object in a section in which the basic region and the reality region are not overlapped.

Meanwhile, if the object (i.e. the vehicle) is found within the searching region (WVF), this object (vehicle) is referred to as a searched object (S140). The physical amount of the searched object may be measured by the laser sensor or the radar sensor and a kind of the corresponding searched object may be determined by the camera sensor. In addition, identification may be assigned to the respective searched objects, thereby sensing and continuously updating a relative physical amount.

That is, the setting step may further include a step (S210) of recognizing the searched object within the searching region and assigning identification to the searched object (i.e. data management) and an updating step (S220) of updating the searched object whenever the front sensor performs the measurement (i.e. improving collision prediction accuracy by predicting data every 1 ms of logic SSP).

In addition, in the updating step, when a capture of a specific searched object which was searched by the front sensor is stopped (S240), data is processed (S260) to predict the physical amount by assuming that the corresponding searched object is moved at the constant speed, such that discontinuity of the data is eliminated and a case of missing the searched object is prevented.

Figure 14:
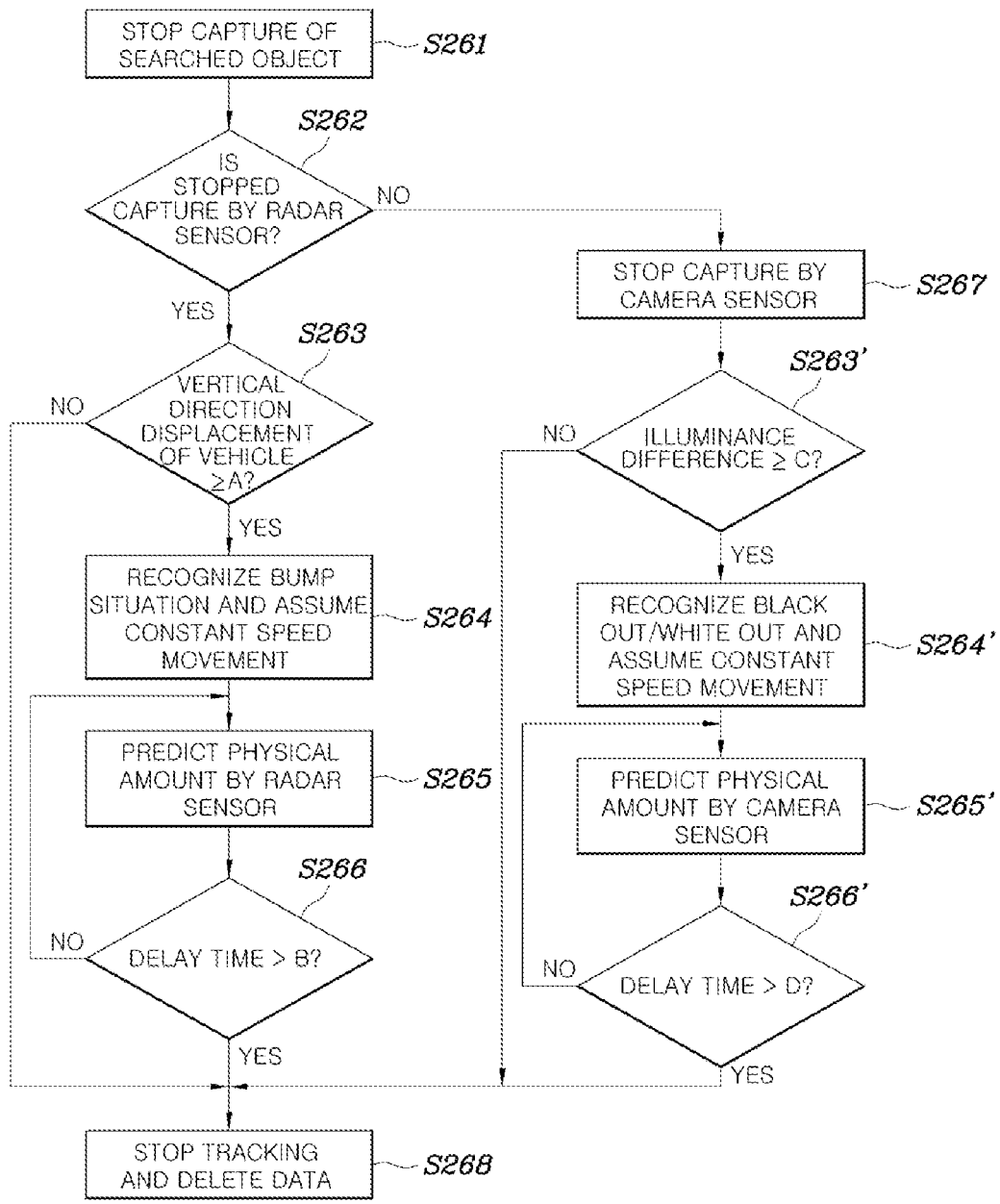
FIG. 14 is a flow chart showing a data processing of the exemplary method for deploying an external air bag according to the present invention.

Specifically, FIG. 14 shows specific processes of the above-mentioned data processing, where in the case in which the capture of the specific searched object which was searched by the front sensor is stopped (S261), the physical amount may be predicted by assuming that the corresponding searched object is moved at the constant speed for a predetermined time and the tracking of the corresponding searched object may be stopped after the predetermined time is elapsed.

Specifically, in the case in which the front sensor is the camera sensor, the capture of the specific searched object which was searched by the camera sensor may be stopped, and the physical amount may be predicted by assuming that the searched object is moved at the constant speed for the predetermined time upon occurrence of black out or white out of the camera sensor.

In addition, in the case in which the front sensor is the radar sensor, the capture of the specific searched object which was searched by the radar sensor may be stopped, and the physical amount may be predicted by assuming that the searched object is moved at the constant speed for the predetermined time in the case in which a vertical direction displacement of the vehicle is changed by a predetermined size or more. In general, since a recognition technology of recognizing lanes by including the camera sensor and the radar sensor and suddenly stopping by recognizing the dangerous object mixes vision data and radar data in fusion, and uses the mixed data, it may be assumed that the present invention also combines and uses both the camera sensor and the radar sensor.

As shown in FIG. 14, it is assumed that the front sensor is the camera sensor and the radar sensor. If the capture of the specific searched object which was searched by the front sensor is normally maintained in the radar sensor, but is stopped in the camera sensor (S267), when the black out or the white out of the camera sensor is simultaneously generated (S263'), the physical amount may be predicted by the camera sensor by assuming that the searched object is moved at the constant speed for the predetermined time (S264', S265', and S266').

That is, when the vehicle enters a tunnel or a parking lot, or exits the tunnel, or in a case of lightening weather, although the actual searched object is not deviated in other directions, camera sensor may not accurately recognize the searched object by the black out or white out phenomenon generated due to severe illuminance difference.

Therefore, in the case in which the illuminance difference of a C value or more is generated in the overall image photographed by the camera, it is assumed that the searched object is present as it is and is moved at the constant speed based on the final physical amount of the searched object for a predetermined time D. In addition, since the black out or the white out of the camera is solved after the predetermined time is elapsed, an object is newly searched and the object is tracked by the predicted constant speed movement until being newly searched.

Meanwhile, if the capture of the specific searched object which was searched by the front sensor is stopped (S262), when the vertical direction displacement of the vehicle is simultaneously changed by a predetermined size or more (S263), the physical amount may be predicted by the radar sensor by assuming that the searched object is moved at the constant speed for the predetermined time (S264, S265, and S266).

That is, a case in which data of the radar sensor is suddenly disappeared may be generally a situation in which the searched object changes a course, or the like, but in a bump situation in which the self vehicle goes over rumble strips or enters a steep slope, although the searched object is actually present effectively in a front, a case in which the searched object is disappeared from the radar sensor may be generated. Therefore, in the case in which the tracking of the radar sensor is lost as described above and a change amount of the vertical direction displacement of the self vehicle has a value A or more, this is recognized as the bump situation to perform a constant speed estimation (S264). The vertical displacement may be easily detected by measuring stroke of a suspension damper, or the like.

In addition, the search object is also predicted to be moved at the constant speed for a time B which is a predetermined time and is processed and the data is deleted (S268), and the searched object is then searched, such that a problem that the collision is not predicted in an interval therebetween may be solved. Of course, when the prediction processing is performed, acceleration and the like may be tracked in a state in which previously predicted data is not deleted and connectivity is maintained, and the deletion of the data may be applied to only a case in which the searched object is actually disappeared.

By the processing as described above, even in the case in which the radar sensor or the camera sensor misses the tracking of the searched object due to the unexpected situation of the driving environment, the searched object is assumed to be moved at the constant speed to thereby continuously maintain the tracking of the searched object, thereby making it possible to stably unfold the external air bag.

In addition, since the case in which the searched object is actually disappeared and the case in which the searched object is missed due to the limitation of the sensor are discriminately controlled by accurately sensing the malfunction of the actual sensor, the erroneous deploying of the air bag may be prevented.

Figure 4:
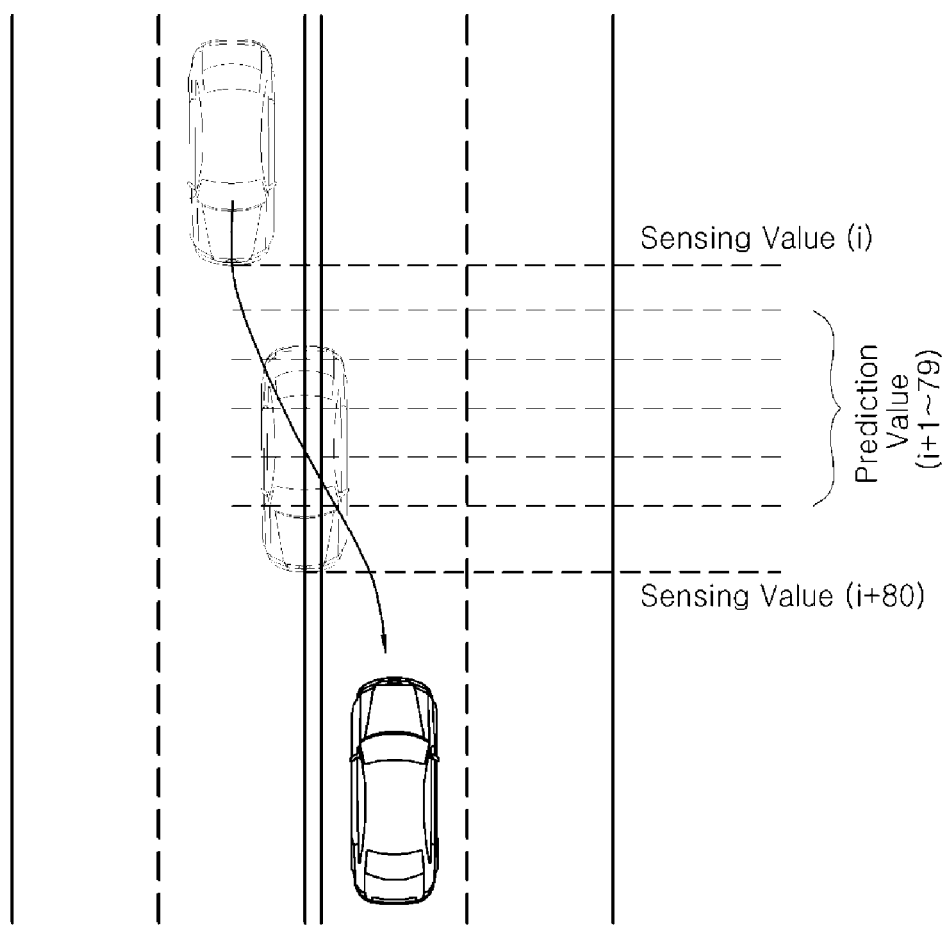
FIG. 4 is a view for describing a predicting process of the method for deploying an external air bag according to the present invention.

Meanwhile, since measurement periods of the sensors are different for every sensor, it is difficult to obtain the measurement period required by the present invention. That is, FIG. 4 is a view for describing a predicting process of a method for deploying an external air bag according to various embodiments of the present invention, where the target selecting step and the predicting step may update data of the searched object and the target object's every measurement period of the front sensor, calculate prediction data every predetermined time between the measurement periods, and use the prediction data as the data of the searched object and the target object.

In an aspect of the present invention, since a unit time of the updating step is set to 1 ms, the deploying determination may be very accurately performed and the determination may be effective even in a high speed situation.

Meanwhile, in the case in which the measurement of the front sensor is performed at a time i, the updating step may calculate a physical amount of i+1 using any one tracking filter of an alpha-beta filter or a kalman filter and may calculate the physical amount using the previous physical amount from i+1 to a next measurement period.

That is, when the measurement period of the sensor is 80 ms, a situation in which data is not provided during 80 ms between the measurement periods may be caused. Therefore, in this case, it is natural that the measurement value needs to be basically updated every 80 ms which is the measurement period, but the updating value may need to be predicted every 1 ms during a time between the measurement periods.

To this end, if the measurement of the sensor was performed at the time i as shown, a value at a time i+1 is obtained using a value at the time i. This value may be calculated using the well known tracking filter such as the alpha-beta filter or the kalman filter.

Thereafter, in calculating the physical amount from i+1 to the next measurement period, the updating step may calculate a displacement by adding a value obtained by multiplying a unit time to a speed of the previous step to a displacement of the previous step.

In addition, in calculating the physical amount from i+1 to the next measurement period, the updating step may calculate a speed from the speed of the previous step by using an acceleration value at the time i.

Meanwhile, in calculating the physical amount from i+1 to the next measurement period, the updating step may calculate TTE by dividing a value obtained by subtracting a thickness of an air bag cushion from a relative distance of the corresponding timing by a relative speed of the corresponding timing, wherein the TTE is the remaining time until being collided with the air bag cushion upon assuming that the external air bag is unfolded.

Specifically, in the time from i+1 to i+79, the updating is performed by using the respective values. This process may be understood by the following Equation.

$$\hat{x}_{i+2} = \hat{x}_{i+1} + \Delta T \hat{v}_{i+1}$$

$$\hat{v}_{i+2} = \hat{v}_{i+1} + \Delta T a_s, \text{TTE} = (\hat{x}_{i+2} - 0.7)/\hat{v}_{i+2} \quad \text{[Equation 2]}$$

($\Delta T$=1 ms, $a_s$: Self Vehicle Acceleration)

As mentioned above, a next position is calculated by a previous position and speed, and a next speed is continuously estimated by current acceleration, that is, acceleration upon performing the sensor measurement. Since a very short time is already used, even though the next speed is accumulated and operated by the current acceleration, an error range thereof is not significantly large. In addition, in a case of the TTE, TTE time may be calculated by subtracting 0.7 m which is the thickness of the air bag from the relative distance every each time, that is, every 1 ms, and then dividing the subtracted value by a speed.

Meanwhile, a danger selecting step S310 of selecting an object having the shortest TTE among the searched objects within the searching region as a dangerous object is performed, where the TTE is the remaining time until being collided with the air bag cushion upon assuming that the external air bag is unfolded. In addition, the danger selecting step may select an object having the shortest (Time to Collision) TTC among the searched objects as the dangerous object, wherein the TTC is the remaining time until being collided with the vehicle upon assuming that the vehicle is collided.

The object having the shortest TTE or TTC among the searched objects within the searching region is first selected as the dangerous object.

Figure 6:
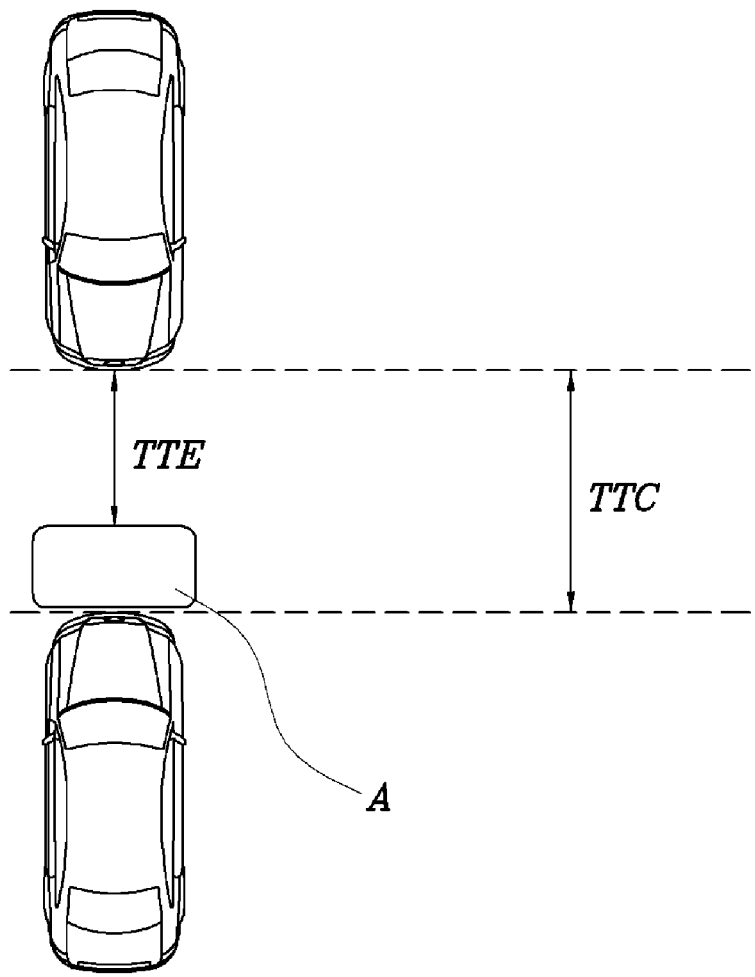
FIG. 6 and FIG. 7 are views for describing Time To Collision (TTC) and Time To External Airbag (TTE) of the exemplary method for deploying an external air bag according to the present invention.
Figure 7:
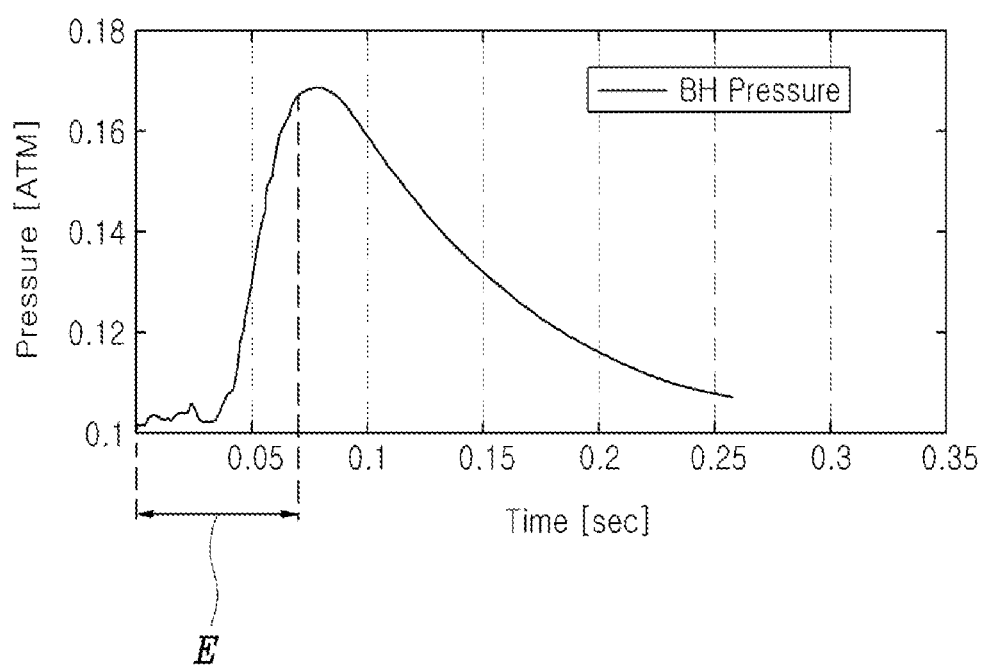

FIGS. 6 and 7 are views for describing TTC and TTE of a method for deploying an external air bag according to various embodiments of the present invention, where the TTE refers to the remaining time until being collided with the air bag cushion upon assuming that the external air bag is unfolded and the TTC refers to the remaining time until being collided with the vehicle upon assuming that the vehicle is collided.

That is, if it is assumed that the air bag is unfolded as shown in FIG. 6, the TTE refers to a time at which the object immediately collides with the air bag at a timing in which the air bag is fully unfolded. In this case, since a pressure of the cushion increased over time according to the deploying of the air bag is maximized when the air bag is fully unfolded, and is then decreased, the TTE is introduced to allow the object to be collided with the air bag when the air bag is maximally fully unfolded. Therefore, in a case of the external air bag, when the TTE is calculated from a distance of a current partner object and the air bag is unfolded at the time of the calculated TTE, the maximum performance may be obtained.

Meanwhile, the TTC, which refers to a time until the object collides with the bumper of the vehicle, is a concept which is frequently used in a concept of a general internal air bag of the vehicle according to the related art.

Therefore, the self vehicle may select the object having the shortest TTC, which is the remaining time until being collided with the vehicle upon assuming that the vehicle is collided, among a plurality of searched objects present within the searching region as the dangerous object, or first select the object having the shortest TTE or TTC among the searched objects within the searching region as the dangerous object.

In addition, whether or not the air bag is unfolded is determined while intensively checking the dangerous object as follows. That is, when a relative speed of the dangerous object is a first reference or more (S320), the overlap is a second reference or more (S330), and the TTE is a third reference or less (S340), the target selecting step of selecting the dangerous object as the target object is performed.

First, the relative speed of the dangerous object is checked. In addition, the relative speed may be a minimum 44 km/h or more as the first reference. The reason is that the relative speed which needs to be at least protected is 44 km/h in the collision of the vehicle.

Figure 5:
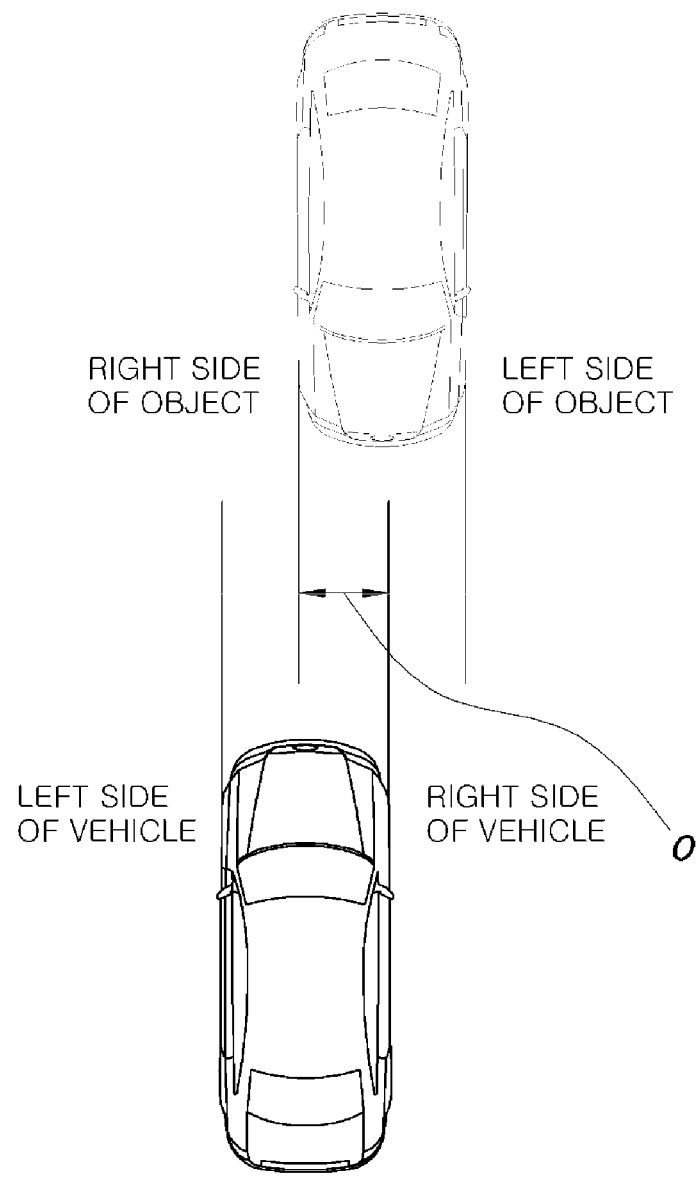
FIG. 5 is a view for describing an overlap determination of the method for deploying an external air bag according to the present invention.

In addition, the dangerous object may have the overlap of 20% or more as the second reference. The overlap is indicated in percentage by selecting a side having a large value of a left boundary of the self vehicle and a right boundary of the partner object and selecting a side having a small value of a right boundary of the self vehicle and a left boundary of the partner object as shown in FIG. 5, determining a value between the selected values as a distance of the overlap, and the dividing the value by the width of the self vehicle and then multiplying the divided value by 100.

Therefore, if the object recognized as the dangerous object has the large relative speed and the large overlap, this object is promoted to the target object.

In addition, if the TTE of the dangerous object is the third reference or less, the dangerous object may be selected as the target object. The reason is that when the dangerous object has the high actual relative speed, the large overlap, and a short collision time, it is an object having very high collision danger.

Meanwhile, a stability determining step (S350) of determining whether the vehicle is stable or unstable by comparing a predicted yaw rate and a measured yaw rate of the vehicle with each other is then performed.

That is, by considering the vehicle as an object of two degrees of freedom, whether or not driving stability of the self vehicle may be maintained is checked. In brief, if a difference between an actual yaw rate and the predicted yaw rate of the vehicle exceeds a predetermined level, it is regarded as the driving stability of the vehicle is broken. Since this is a portion widely utilized in electric stability program (ESP), which is a vehicle position supporting technology according to the related art, a detailed description thereof will be omitted.

Figure 8A:
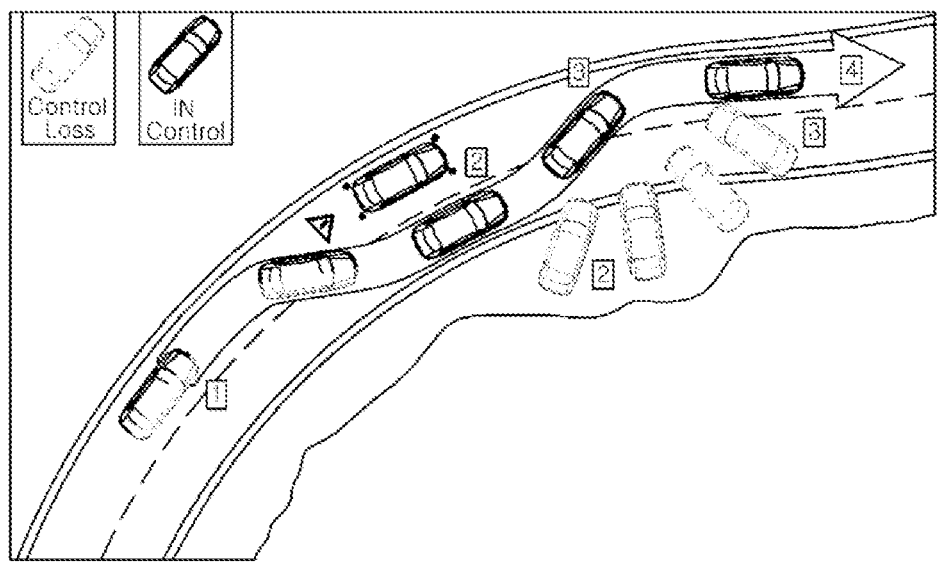
FIG. 8A, FIG. 8B and FIG. 8C are views for describing a stability determining step of the exemplary method for deploying an external air bag according to the present invention.
Figure 8B:
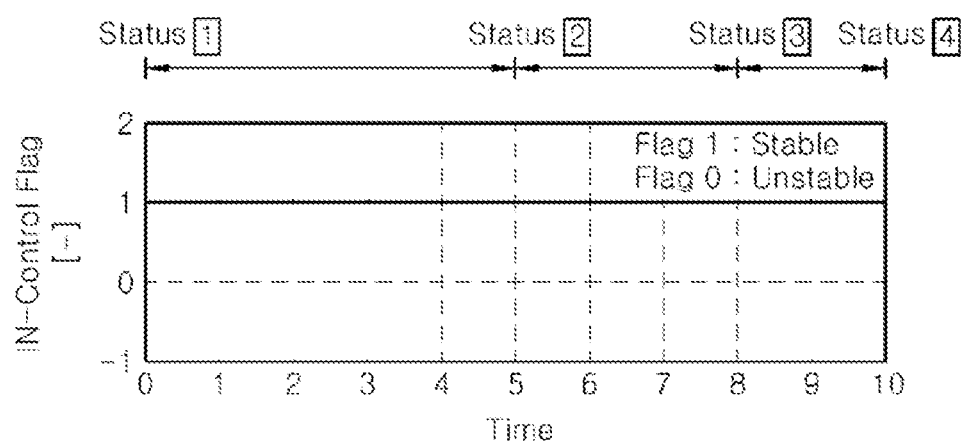
Figure 8C:
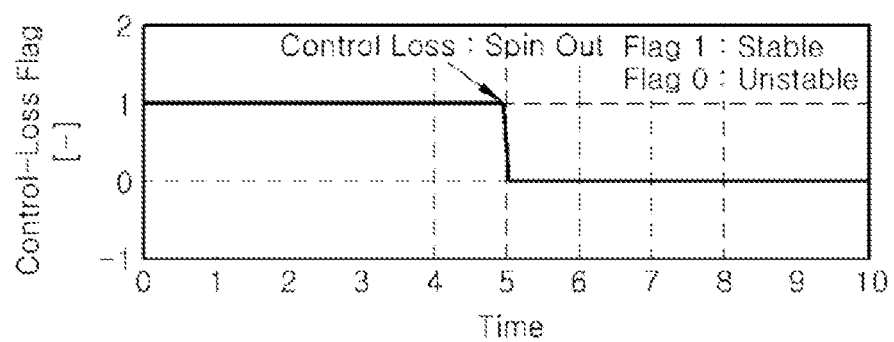

FIG. 8 is a view for describing a stability determining step of a method for deploying an external air bag according to various embodiments of the present invention, where in the case in which the vehicle may be driven in a state in which stability of traction is secured, this case is designated as FLAG 1 to proceed to a situation in which the external air bag may be unfolded, and in the case in which stability of traction is lost, this case is stored as FLAG 0 to prevent the deploying of the external air bag. Therefore, since the external air bag is unfolded even in a case in which the driving of the self vehicle is dangerous, factors obstructing the driving may be blocked in advance.

In addition, the prediction step (S410, S420, S430, and S440) of determining whether the predicted relative speed and the overlap is a predetermined level or more upon assuming that the vehicle is collided is then performed. In addition, the predetermined level of the prediction step and the deploying step may be the first reference in a case of the relative speed and the second reference in a case of the overlap.

Figure 9:
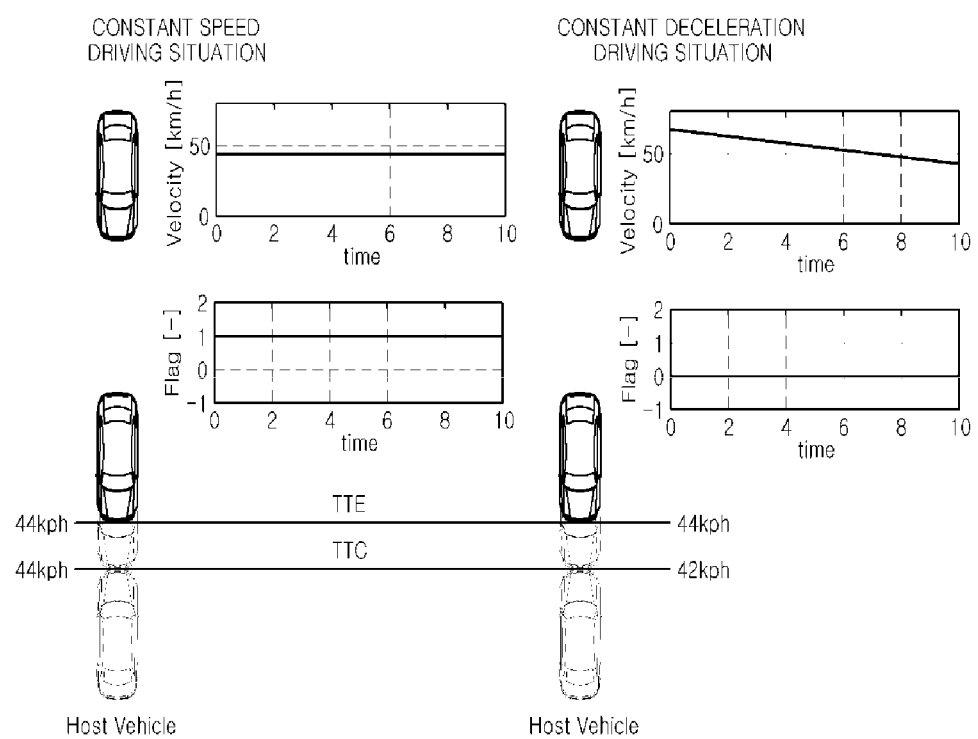
FIG. 9 and FIG. 10 are views for describing a predicting step of the exemplary method for deploying an external air bag according to the present invention.
Figure 10:
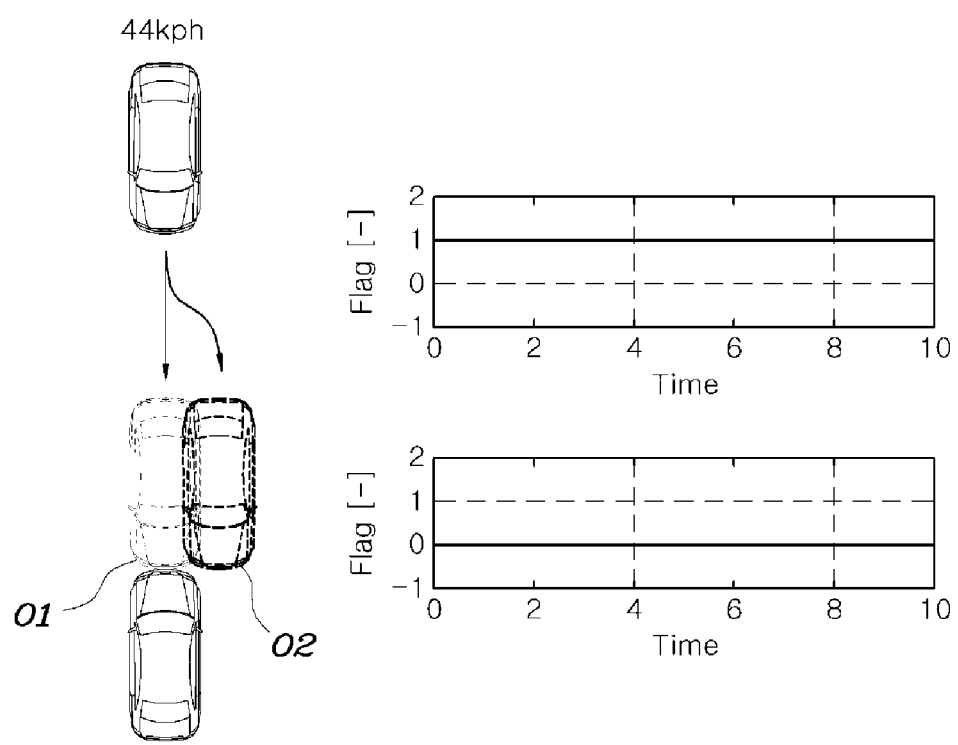

FIGS. 9 and 10 are views for describing a predicting step of a method for deploying an external air bag according to various embodiments of the present invention, wherein if the target object and the self vehicle are in a constant speed driving situation, they may still maintain and satisfy the previous case in which the relative speed exceeds the first reference. However, if the target object and the self vehicle are in a constant deceleration situation, the relative speed may be 42 km/h lower than 44 km/h at the actual collision time and in this case, it is not necessary to unfold the external air bag.

Therefore, although the relative speed of the current target object exceeds 44 km/h, which is a minimum reference value, if the predicted value at the collision time does not exceed the 44 km/h, the air bag is not unfolded. This may be detected by calculating an average of data of the relative speed for a predetermined time, calculating relative acceleration by dividing the average by the time, and then predicting and tracking the relative speed at a TTC instant through the relative acceleration.

In addition, also similarly in a case of the overlap, as shown in FIG. 10, by predicting the TTC, that is, the overlap generated at the collision instant, whether or not the actual collision occurs at the overlap of 20% or more is predicted. Similarly, the overlap may be predicted by calculating an average of the transverse relative speed to date and tracking the transverse relative displacement at the TTC instant through the average.

Thereby, although the current relative speed exceeds 44 km/h and the current overlap exceeds 20%, if the TTC, that is, the relative speed predicted at the collision instant does not exceed 44 km/h or the overlap does not exceed 20%, the external air bag is not unfolded, thereby making it possible to prevent an erroneous deploying of the external air bag.

In addition, in the case in which the predicted relative speed and the overlap of the target object is a predetermined level or more and collision probability and a change rate of the collision probability is a predetermined level or more, the external air bag may be unfolded (S510 and S520). That is, the collision probability (CP) may be defined as the following Equation.

$$CP = \frac{1}{TTC} \text{ or } CP = \frac{Overlap}{TTC} \qquad \text{[Equation 3]}$$

Therefore, the TTC is calculated as described above and a reciprocal number thereof is taken or an amount of overlap is multiplied to the reciprocal number, such that the collision probability is calculated. When the collision probability exceeds the predetermined value, it is regarded as a case in which an actual collision probability is very high, thereby preventing the erroneous deploying of the external air bag by deploying the air bag.

In addition, in the case in which the collision probability is calculated every 1 ms and a gradient of the change rate of the collision probability is a predetermined gradient or less, the air bag is not unfolded, thereby also preventing the erroneous deploying of the external air bag.

Figure 11:
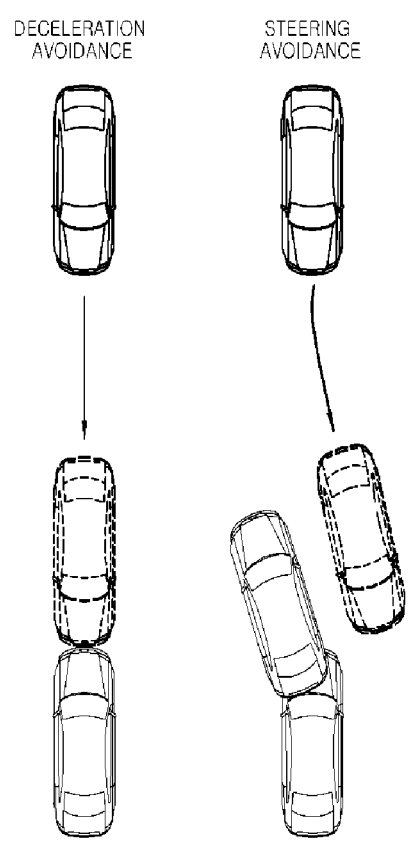
FIG. 11, FIG. 12 and FIG. 13 are views for describing an avoiding step of the exemplary method for deploying an external air bag according to the present invention.
Figure 11:
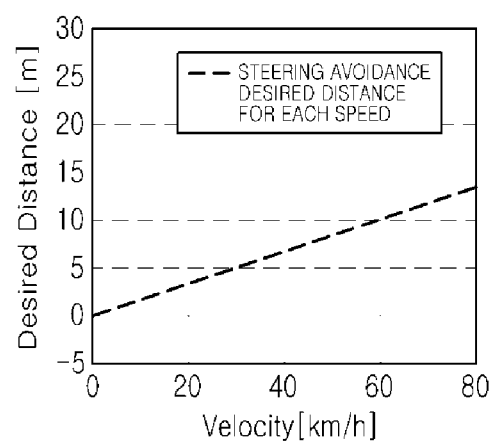
Figure 11:
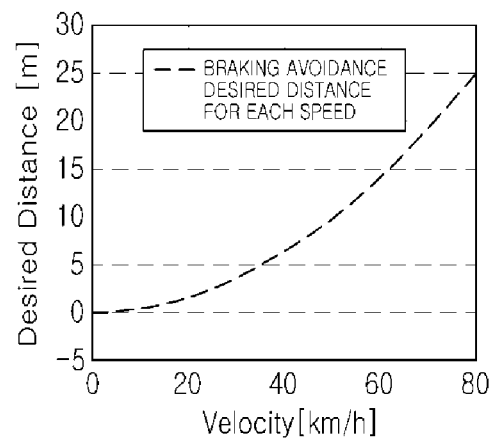
Figure 12:
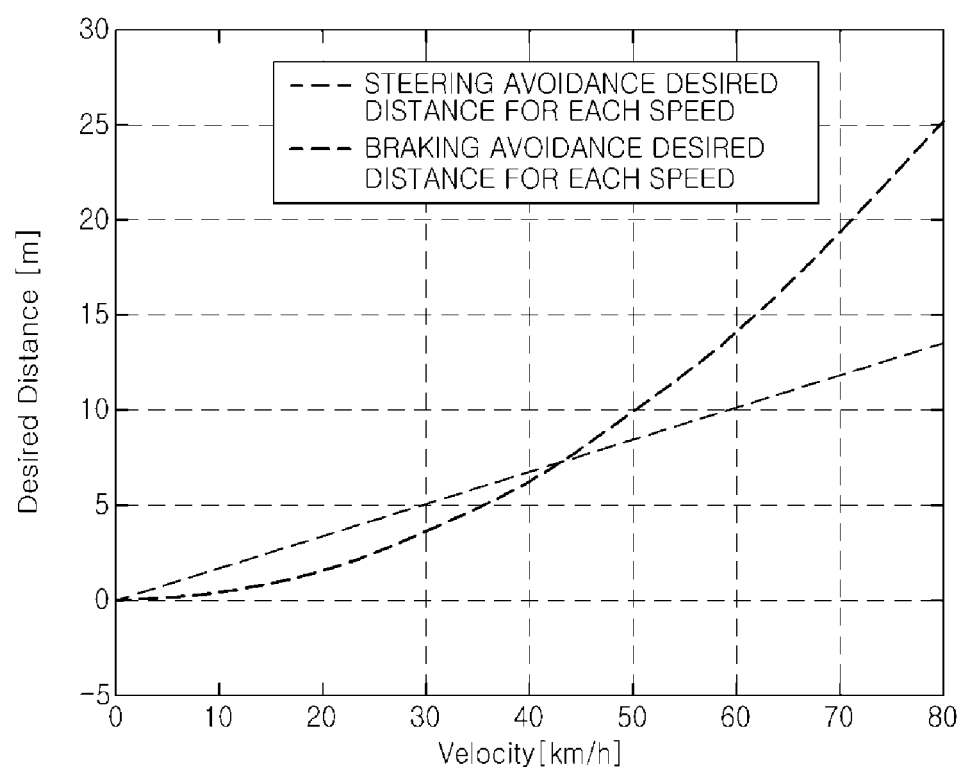

Meanwhile, when the vehicle has a distance from the target object smaller than a steering avoidance desired distance and a braking avoidance desired distance, the external air bag may be unfolded (S530 and S540). In S530 and S540 of FIG. 1, a word of "PONR" implies whether or not collision is avoidable. That is, FIGS. 11 to 13 are views for describing an avoiding step of a method for deploying an external air bag according to an exemplary embodiment of the present invention, wherein since the vehicle may suddenly avoid the collision by deceleration or steering, this step may be basically represented by a relationship between the relative speed and the relative distance.

Figure 13:
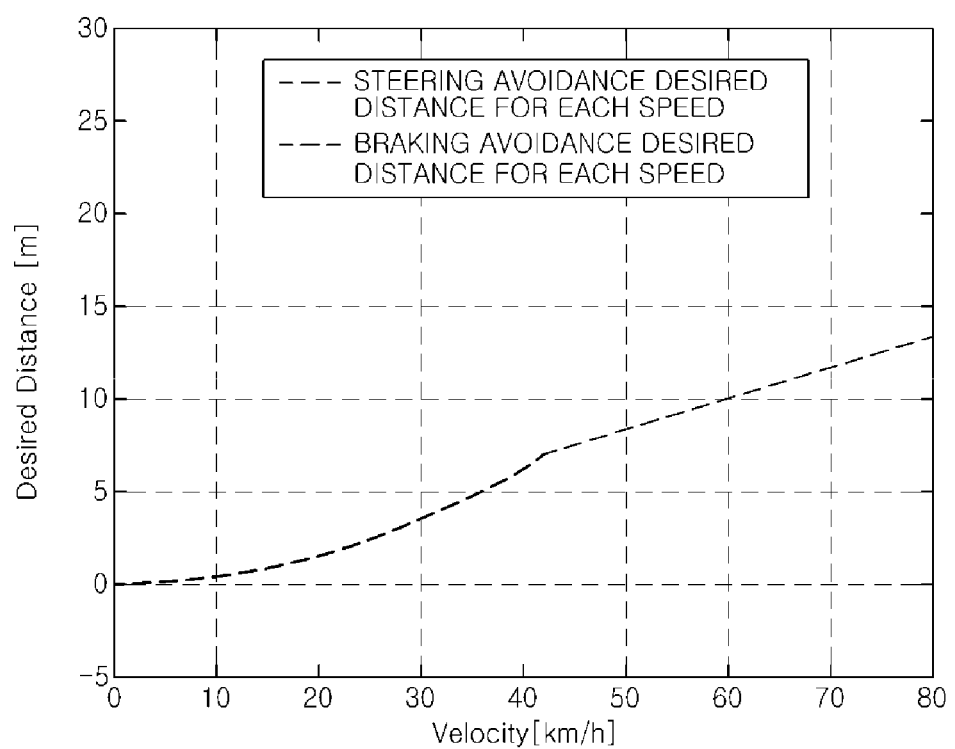

Therefore, in a case corresponding to a lower portion of a line in a graph of FIG. 13, which is a common dominator, generated by overlapping the respective graphs with regard to the relative speed, the steering avoidance desired distance, and the braking avoidance desired distance, this lower portion indicates a case which cannot possibly avoid even if the braking or the steering is performed. Therefore, the air bag is unfolded only in this case, thereby making it possible to conservatively prevent a malfunction of the air bag.

The braking avoidance desired distance may be expressed by the following Equation.

$$d_{braking} = \frac{v_0^2 - v^2}{2a_x} \quad (v = 0, a_x = 1.0 \text{ g}) \quad \text{[Equation 4]}$$

This represents a function obtained by dividing a square of relative speed by twice of acceleration of gravity g.

In addition, the steering avoidance desired distance may be expressed by the following Equation.

$$d_{steering} = \sqrt{\frac{2 \cdot o_i}{a_y}} \cdot v_{rel} \quad \text{[Equation 5]}$$

$o_i$ = Current Overlap Amount $\sqrt{\frac{2 \cdot o_i}{a_y}}$ = Required Time to avoid Current Overlap Amount ($o_i$) to $a_y$ (1.0 g)

This may calculate the steering avoidance desired distance by dividing twice of the current overlap by a transverse relative acceleration, applying a square root thereto, and then multiplying a transverse relative speed thereto.

Meanwhile, after performing the above-mentioned processes, a confirmation step (S560) of confirming an existence of the target object by an ultrasonic sensor is finally performed to thereby prevent an error of the sensor, whether communication and components are normal is checked (S570), and the air bag (EAB) is then unfolded (S580).

Again describing the method of deploying the external air bag according to various embodiments of the present invention, first, only data of a substantial object is observed by setting the searching region taking account of deploying characteristics of the external air bag, such that load of the data process may be significantly decreased.

In addition, since the data is predicted and calculated after each measurement period of the sensor, data having a unit of 1 ms may be generated, such that it is possible to stably handle even in the high speed situation.

After the dangerous object is primarily selected based on the TTC and TTE, the dangerous object is promoted to the target object by taking account of the relative speed, the overlap, and the TTE, such that the object is specified to be matched to the actual collision situation and is continuously tracked.

In addition, even in the case in which the erroneous object is promoted to the target object, a filtering is performed by taking account of the relative speed and the overlap at the TTC time, thereby preventing the erroneous deploying, and the target is filtered by taking account of the collision probability and the change rate thereof, the stability of the vehicle, the steering avoidance desired distance, and the braking avoidance desired distance, thereby significantly decreasing a problem of malfunction.

According to the method for deploying the external air bag having the configurations as described above, even in the case in which the radar sensor or the camera sensor misses the tracking of the searched object due to the unexpected situation of the driving environment, the searched object is assumed to be moved at the constant speed to thereby continuously maintain the tracking of the searched object, thereby making it possible to stably unfold the external air bag.

In addition, since the case in which the searched object is actually disappeared and the case in which the searched object is missed due to the limitation of the sensor are discriminately controlled by accurately sensing the malfunction of the actual sensor, the erroneous deploying of the air bag may be prevented.

Because it is lacking to detect the physical amount measured by the front sensor using only a period of the sensor, the physical amount is obtained by predicting the physical amount every unit time and the deploying determination is performed based on the obtained physical amount, the substantial and effective deploying determination may be performed even at the time of high speed collision or unexpected collision.

In addition, the precise controlling method capable of preventing the erroneous deploying and obtaining the effective deploying by the accurate collision determination may be suggested. In addition, even in the case in which the measurement performance of the sensor is lacking, the data managing method capable of supporting the lacking measurement performance to thereby maximally perform the effective determination may be suggested.

In addition, a logic capable of surely preventing the erroneous deploying by finally checking validity of the deploying once more may be suggested.

Although the present invention has been shown and described with respect to specific exemplary embodiments, it will be obvious to those skilled in the art that the present invention may be variously modified and altered without departing from the spirit and scope of the present invention as defined by the following claims.

As illustrated in FIG. 10, the user then may secure a mirror size that is increased in a vertical direction, and may see the entire face at a look.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for deploying an external air bag, the method comprising:
   a setting step, by a controller, of setting a searching region of a front of a vehicle;
   an updating step, the controller, of updating a physical amount of a searched object within the searching region each measurement period of a front sensor, determining a predicted physical amount each unit time during each measurement period, and predicting the physical amount by assuming that a specific searched object is moved at a constant speed when a capture of the specific searched object which was searched by the front sensor is stopped,
   wherein in the updating step, in a case in which the measurement of the front sensor is performed at a time i, a physical amount of i+1 is determined using at least one filter selected from the group consisting of an alpha-beta filter and a kalman filter, and using a previous physical amount from i+1 to a next measurement amount;
   a target selecting, by the controller, step of selecting a target object among searched objects based on a relative speed or an overlap of the searched object obtained by the updating step or Time To External Airbag (TTE) which is a remaining time until the target object collides with an air bag cushion upon assuming that the external air bag is deployed; and
   a deploying step, by the controller, of deploying the external air bag in a case in which each of a relative speed and an overlap predicted when the target object collides are a predetermined level or more.

2. The method of claim 1, wherein in the updating step, when the capture of the specific searched object which was searched by the front sensor is stopped, the physical amount is predicted by assuming that the corresponding searched object is moved at the constant speed for a predetermined time, and a tracking of the corresponding searched object is stopped after the predetermined time is elapsed.

3. The method of claim 1, wherein the front sensor is a camera sensor, and in the updating step, the capture of the specific searched object which was searched by the camera sensor is stopped, and the physical amount is predicted by assuming that the searched object is moved at the constant speed for the predetermined time upon occurrence of black-out or white-out of the camera sensor.

4. The method of claim 1, wherein the front sensor is a radar sensor, and in the updating step, the capture of the specific searched object which was searched by the radar sensor is stopped, and the physical amount is predicted by assuming that the searched object is moved at the constant speed for a predetermined time in a case in which a vertical direction displacement of the vehicle is changed by a predetermined size or more.

5. The method of claim 1, wherein the front sensor is a camera sensor and a radar sensor, and in the updating step, in a case in which the capture of the specific searched object which was searched by the front sensor is normally maintained in the radar sensor, but is stopped in the camera sensor, when a black-out or a white-out of the camera sensor is simultaneously generated, the physical amount is predicted by the camera sensor by assuming that the searched object is moved at the constant speed for a predetermined time.

6. The method of claim 5, wherein in the updating step, in a case in which the capture of the specific searched object which was searched by the front sensor is stopped in the radar sensor, when the vertical direction displacement of the vehicle is simultaneously changed by a predetermined size or more, the physical amount is predicted by the radar sensor by assuming that the searched object is moved at the constant speed for the predetermined time.

7. The method of claim 1, wherein the setting step includes a managing step of assigning to and managing identification of each searched object.

8. The method of claim 1, wherein the each unit time in the updating step is 1 ms.

9. The method of claim 1, wherein in the updating step, in determining the physical amount from i+1 to the next measurement period, a displacement is determined by adding a value obtained by multiplying a unit time to a speed of the previous step to a displacement of the previous step.

10. The method of claim 1, wherein in the updating step, in determining the physical amount from i+1 to a next measurement period, a speed is determined from the speed of the previous step by using an acceleration value at a time i.

11. The method of claim 1, wherein in the updating step, in determining the physical amount from i+1 to a next measurement period, TTE is determined by dividing a value obtained by subtracting a thickness of the air bag cushion from a relative distance of a corresponding timing by a relative speed of the corresponding timing, wherein the TTE is a remaining time until being collided with the air bag cushion upon assuming that the external air bag is unfolded.

* * * * *